(12) United States Patent
Vimercati et al.

(10) Patent No.: US 12,255,984 B2
(45) Date of Patent: Mar. 18, 2025

(54) DATA INVALIDATION FOR MEMORY

(71) Applicant: Micron Technology, Inc., Boise, ID (US)

(72) Inventors: Daniele Vimercati, El Dorado Hills, CA (US); Simon J. Lovett, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 457 days.

(21) Appl. No.: 17/331,578

(22) Filed: May 26, 2021

(65) Prior Publication Data

US 2022/0385451 A1  Dec. 1, 2022

(51) Int. Cl.
| | |
|---|---|
| H04L 9/06 | (2006.01) |
| G06F 3/06 | (2006.01) |
| G06F 21/62 | (2013.01) |
| G11C 29/38 | (2006.01) |
| G11C 29/44 | (2006.01) |

(Continued)

(52) U.S. Cl.
CPC .......... *H04L 9/0643* (2013.01); *G06F 3/0623* (2013.01); *G06F 3/0659* (2013.01); *G06F 3/0683* (2013.01); *G06F 21/6245* (2013.01); *G11C 29/38* (2013.01); *G11C 29/4401* (2013.01); *G06F 7/588* (2013.01); *G06F 21/62* (2013.01); *H04L 9/08* (2013.01); *H04L 9/0869* (2013.01); *H04L 2209/08* (2013.01); *H04L 2209/12* (2013.01)

(58) Field of Classification Search
CPC ..... H04L 9/08; H04L 9/0869; H04L 2209/12; G06F 21/62

See application file for complete search history.

(56) References Cited

U.S. PATENT DOCUMENTS

| | | | |
|---|---|---|---|
| 7,873,837 B1* | 1/2011 | Lee | G06F 21/32 |
| | | | 713/189 |
| 9,383,969 B2 | 7/2016 | Van Der Sluis et al. | |

(Continued)

FOREIGN PATENT DOCUMENTS

TW  202109335 A  3/2021

OTHER PUBLICATIONS

Taiwanese Patent Office, "Office Action," issued in connection with Taiwanese Patent Application No. 111118840 dated Feb. 22, 2023 (22 pages) (9 pages of English Translation and 13 pages of Original Document).

(Continued)

*Primary Examiner* — Ellen Tran
(74) *Attorney, Agent, or Firm* — Holland & Hart LLP

(57) ABSTRACT

Methods, systems, and devices for memory operations are described. First scrambling sequences may be generated for first addresses of a memory device after an occurrence of a first event, where the first addresses may be associated with commands received at the memory device. Portions of the memory array corresponding to the first address may be accessed based on the first scrambling sequences. After an occurrence of a subsequent event, second scrambling sequences may be generated for the first addresses, where the second scrambling sequences may be different than the first set of scrambling sequences. After the occurrence of the subsequent event, the portions of the memory array may be accessed based on the second scrambling sequences.

23 Claims, 7 Drawing Sheets

(51) Int. Cl.
*G06F 7/58* (2006.01)
*H04L 9/08* (2006.01)

(56) References Cited

U.S. PATENT DOCUMENTS

| | | | |
|---|---|---|---|
| 9,576,624 | B2 | 2/2017 | Lien et al. |
| 10,056,129 | B1 | 8/2018 | Sakurai et al. |
| 10,229,727 | B1 | 3/2019 | Sakurai et al. |
| 10,665,290 | B1 * | 5/2020 | He .................. G11C 11/40611 |
| 10,685,694 | B2 | 6/2020 | Sakurai et al. |
| 10,991,409 | B2 | 4/2021 | Lu et al. |
| 2013/0238907 | A1 * | 9/2013 | Debout .............. G06F 12/1441 |
| | | | 713/193 |
| 2014/0032935 | A1 * | 1/2014 | Kim .................... G06F 21/6218 |
| | | | 713/193 |
| 2014/0310534 | A1 | 10/2014 | Gurgi et al. |
| 2016/0364343 | A1 * | 12/2016 | Case .................... G06F 12/145 |
| 2017/0018317 | A1 * | 1/2017 | Kim ....................... G11C 17/16 |
| 2018/0189493 | A1 * | 7/2018 | Schilder ........... G01R 31/31719 |
| 2020/0401549 | A1 | 12/2020 | Usach Merino et al. |
| 2021/0051010 | A1 | 2/2021 | Yang et al. |

OTHER PUBLICATIONS

"International Search Report and Written Opinion of the International Searching Authority," issued in connection with Int'l Appl. No. PCT/US2022/072166 dated Sep. 6, 2022 (11 pages).

* cited by examiner

DATA INVALIDATION FOR MEMORY

FIELD OF TECHNOLOGY

The following relates generally to one or more systems for memory and more specifically to data invalidation for memory.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source. FeRAM may be able to achieve densities similar to volatile memory but may have non-volatile properties due to the use of a ferroelectric capacitor as a storage device.

DETAILED DESCRIPTION

Figure 1:
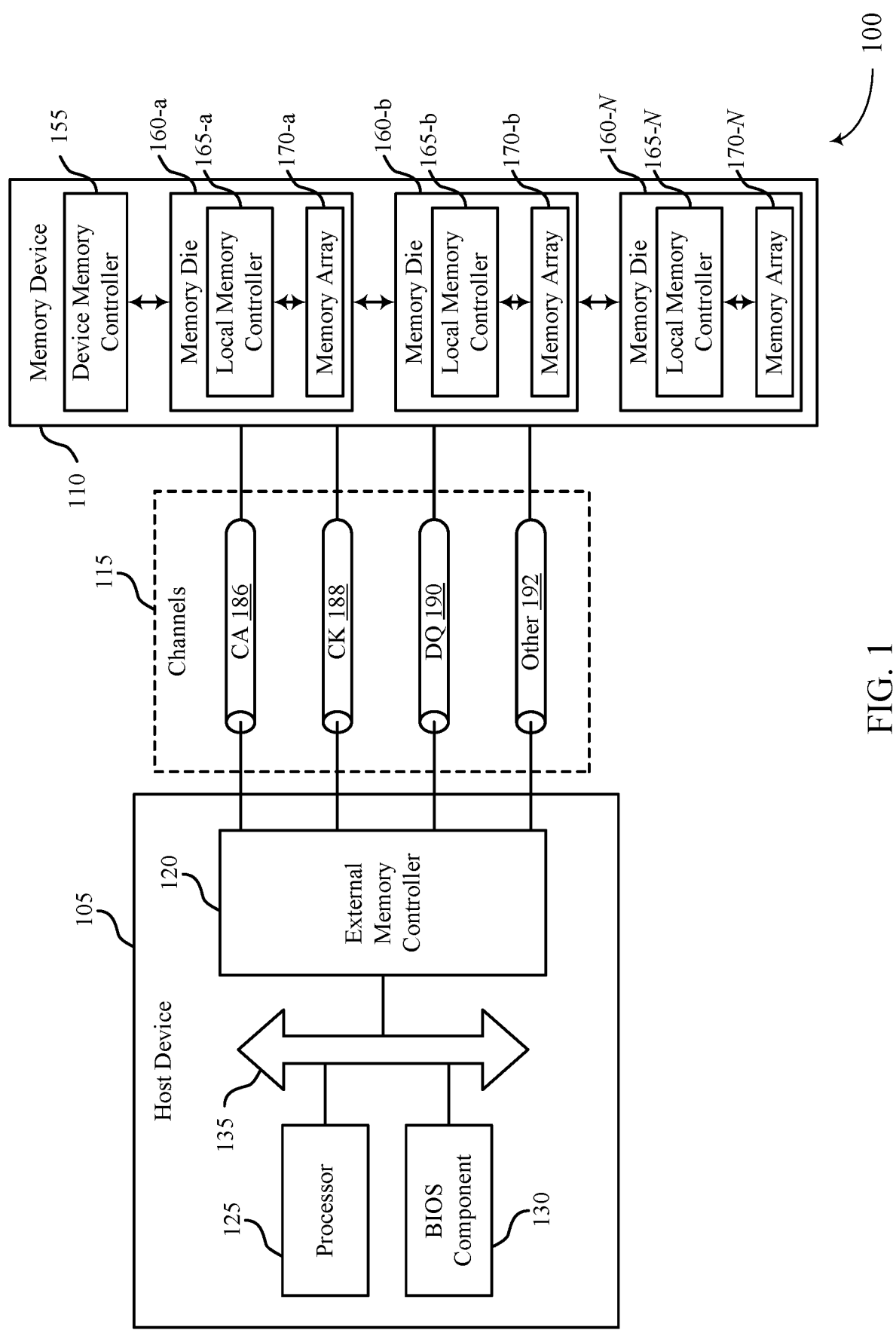
FIG. 1 illustrates an example of a system that supports data invalidation for memory in accordance with examples as disclosed herein.

A memory device may include non-volatile memory cells, volatile memory cells, or both. Non-volatile memory cells may retain their logic states when power is removed from the memory device, while volatile memory cells may lose (e.g., nearly instantaneously) their logic states when power is removed from the memory device. An application at a host device may store sensitive information in volatile memory cells based on the understanding that the data stored in the volatile memory cells will become invalid when power is removed from the memory device.

In some examples, however, a memory device may include memory cells having non-volatile properties (e.g., the logic states of the memory cells may be retained when power is removed from the memory device) and volatile properties (e.g., the logic states of the memory cells may degrade and become lost after a period of time elapses). Ferroelectric random-access memory (FeRAM) cells may be an example of memory cells that have both non-volatile and volatile properties, among other technologies such as PCM cells, MRAM cells, and the like. Further, even memory cells traditionally thought of as volatile may exhibit non-volatility to some degree, with logic states retained for some duration of time (though perhaps a short duration relative to memory cells traditionally thought of as non-volatile). Thus, volatility may in some cases be a matter of degree, and the extent to which (e.g., duration for which) a memory cell of a given type exhibits non-volatility (e.g., retains data in the absence of power) may depend on one or more conditions (e.g., a temperature of the memory cell). Thus, any type of memory cell may in some cases be considered as having both non-volatile and volatile properties to some extent.

In some cases, applications at a host device may store (e.g., write, program) sensitive information to memory cells. If the memory cells exhibit at least some non-volatile properties, the sensitive information may be left susceptible to unwanted data harvesting attempts (e.g., by cyber criminals). For example, a malicious actor that gains access to the memory device (including after the memory device is disconnected from a power source) may be able to access the data stored by inspecting the logic states retained by the memory cells.

To enable applications that store sensitive data to use a memory device that primarily includes memory cells with non-volatile properties (e.g., memory cells that exhibit at least some degree of non-volatility, even if such memory cells also exhibit some degree of volatility in some cases), techniques for invalidating, after the occurrence of an event, the data stored in the memory cells may be established. In some examples, after a first event occurs (e.g., a power-on event), one or more scrambling sequences may be generated for one or more addresses of the memory device—e.g., as commands associated with accessing memory cells (e.g., a page of memory cells or a prefetch group of memory cells) at the one or more addresses are received. The one or more scrambling sequences may be used to access the memory cells at the one or more addresses—e.g., to scramble data before it is written to the memory cells and to descramble data read from the memory cells. In some examples, after a subsequent event occurs (e.g. another power-on event), one or more different scrambling sequences may be generated for the one or more or more addresses of the memory device, where the different scrambling sequences may be used to access the memory cells at the one or more addresses, thus invalidating data stored in the memory cells.

In some examples, circuitry that implements a hash function is used to generate the one or more scrambling sequences based on the addresses associated with the commands received at the memory device and a first random number generated in response to the occurrence of the event. The hash function may also be used to generate the one or more different scrambling sequences based on the addresses associated with second commands received at the memory device and a second random number generated in response to the occurrence of the subsequent event. A hash function may generate substantially different memory scrambling sequences for the addresses of the memory device based on small changes in the random number.

By generating new sets of scrambling sequences for addresses of the memory device based on the occurrence of an event, data stored in the memory cells before the occurrence of the event may be invalidated. Also, by generating different scrambling sequences for the addresses of the memory device (e.g., instead of one scrambling sequence for the memory device), a complexity associated with descrambling the data stored at the memory device (e.g., by a malicious actor) may be increased.

Features of the disclosure are initially described in the context of systems and dies. Features of the disclosure are also described in the context of memory devices and flowcharts. These and other features of the disclosure are further illustrated by and described with reference to an apparatus diagram and flowcharts that relate to data invalidation for memory.

FIG. 1 illustrates an example of a system 100 that supports data invalidation for memory in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general-purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160 a, memory die 160 b, memory die 160 N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channels 186 may carry a read command with an address of the desired data. In some examples, a CA channel 186 may include any quantity of signal paths to decode one or more of address or command data (e.g., eight or nine signal paths).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

A memory device 110 may generate first scrambling sequences for first addresses of the memory device 110 after an occurrence of a first event. In some examples, the first addresses may be associated with commands received at the memory device 110. After the occurrence of the first event, the memory device 110 may access portions of a memory array 170 corresponding to the first address using the first scrambling sequences. After the occurrence of a subsequent event, the memory device 110 may generate second scrambling sequences for the first addresses. In some examples, the second scrambling sequences may be different than the first set of scrambling sequences. After the occurrence of the subsequent event, the memory device 110 may access the portions of the memory array 170 using the second scrambling sequences.

Figure 2:
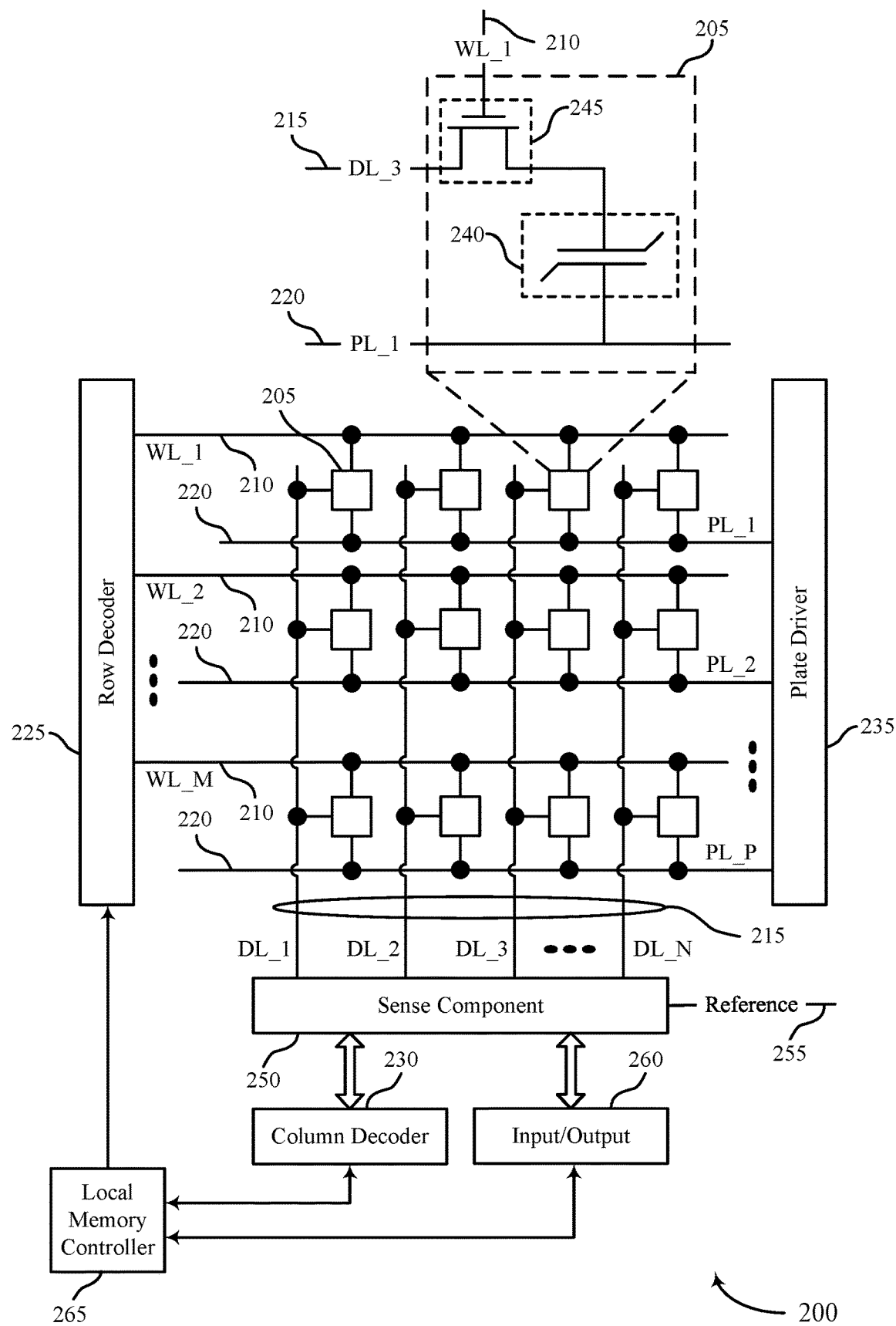
FIG. 2 illustrates an example of a memory die that supports data invalidation for memory in accordance with examples as disclosed herein.

FIG. 2 illustrates an example of a memory die 200 that supports data invalidation for memory in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a state (e.g., polarization state or dielectric charge) representative of the programmable states in a capacitor. In FeRAM architectures, the memory cell 205 may include a capacitor 240 that includes a ferroelectric material to store a charge and/or a polarization representative of the programmable state. The memory cell 205 may include a logic storage component, such as capacitor 240, and a switching component 245. The capacitor 240 may be an example of a ferroelectric capacitor. A first node of the capacitor 240 may be coupled with the switching component 245 and a second node of the capacitor 240 may be coupled with a plate line 220. The switching component 245 may be an example of a transistor or any other type of switch device that selectively establishes or de-establishes electronic communication between two components.

The memory die 200 may include access lines (e.g., the word lines 210, the digit lines 215, and the plate lines 220) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, bit lines, or plate lines, or their analogues, are interchangeable without loss of understanding or operation. Memory cells 205 may be positioned at intersections of the word lines 210, the digit lines 215, and/or the plate lines 220.

Operations such as reading and writing may be performed on memory cells 205 by activating or selecting access lines such as a word line 210, a digit line 215, and/or a plate line 220. By biasing a word line 210, a digit line 215, and a plate line 220 (e.g., applying a voltage to the word line 210, digit line 215, or plate line 220), a single memory cell 205 may be accessed at their intersection. Activating or selecting a word line 210, a digit line 215, or a plate line 220 may include applying a voltage to the respective line.

Accessing the memory cells 205 may be controlled through a row decoder 225, a column decoder 230, and a plate driver 235. For example, a row decoder 225 may receive a row address from the local memory controller 265 and activate a word line 210 based on the received row address. A column decoder 230 receives a column address from the local memory controller 265 and activates a digit line 215 based on the received column address. A plate driver 235 may receive a plate address from the local memory controller 265 and activates a plate line 220 based on the received plate address.

Selecting or deselecting the memory cell 205 may be accomplished by activating or deactivating the switching component 245. The capacitor 240 may be in electronic communication with the digit line 215 using the switching component 245. For example, the capacitor 240 may be isolated from digit line 215 when the switching component 245 is deactivated, and the capacitor 240 may be coupled with digit line 215 when the switching component 245 is activated.

The sense component 250 may determine a state (e.g., a polarization state or a charge) stored on the capacitor 240 of the memory cell 205 and determine a logic state of the memory cell 205 based on the detected state. The sense component 250 may include one or more sense amplifiers to amplify the signal output of the memory cell 205. The sense component 250 may compare the signal received from the memory cell 205 across the digit line 215 to a reference 255 (e.g., a reference voltage). The detected logic state of the memory cell 205 may be provided as an output of the sense component 250 (e.g., to an input/output 260), and may indicate the detected logic state to another component of a memory device 110 that includes the memory die 200.

The local memory controller 265 may control the operation of memory cells 205 through the various components (e.g., row decoder 225, column decoder 230, plate driver 235, and sense component 250). The local memory controller 265 may be an example of the local memory controller 165 described with reference to FIG. 1. In some examples, one or more of the row decoder 225, column decoder 230, and plate driver 235, and sense component 250 may be co-located with the local memory controller 265. The local memory controller 265 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 265 may generate row signals and column address signals to activate the target word line 210, the target digit line 215, and the target plate line 220. The local memory controller 265 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 265 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 265 in response to various access commands (e.g., from a host device 105). The local memory controller 265 may be operable to perform other access operations not listed here or other operations related to the operating of the memory die 200 that are not directly related to accessing the memory cells 205.

A memory device that includes one or more memory dies, such as memory die 200, may include non-volatile memory cells (e.g., not AND (NAND) memory cells), volatile memory cells (e.g., DRAM cells), or both. A non-volatile memory cell may be programmed in one of multiple stable logic states that may be retained when no voltage is applied to or across the memory cell—e.g., when the memory die is disconnected from a power source. Non-volatile memory cells may retain their programmed logic states for months or years after the memory die is powered off. Thus, the data stored by a non-volatile memory cell during operation of the memory die may be accessible after the memory die when the memory die is reconnected to the power source. A volatile memory cell, by contrast, may be programmed in one of multiple unstable logic states that may be lost if a voltage is no longer applied to or across the memory cells—e.g., if the memory die is disconnected from a power source. Volatile memory cells may lose their logic states within seconds of the memory die being powered off. In some examples, periodic refresh operations may be used during operation of the memory die 200 to maintain a logic state of volatile memory cells.

In some examples, the memory device may include a memory die that has memory cells that exhibit non-volatile properties (e.g., the logic states of the memory cells may be retained when power is removed from the memory device) and volatile properties (e.g., the logic states of the memory cells may degrade and become lost after a period of time elapses). For example, the memory die may include memory cells that are programmed into one of multiple stable logic states that may be retained when the memory die is powered off. However, the logic states of the memory cells may degrade quickly (relative to non-volatile memory cells) once the memory die is powered off. That is, such memory cells may lose their logic states within minutes, hours, or days of the memory die being powered off.

In some examples, an FeRAM cell is an example of a memory cell that exhibits non-volatile and volatile properties, and memory die 200 may be an example of a memory die that includes memory cells with non-volatile and volatile properties. That is, a remnant polarization of an FeRAM cell may store a logic state of the FeRAM cell when no voltage is applied to or across the FeRAM cell. However, the remnant polarization of the FeRAM cell may degrade quickly relative to non-volatile memory cells—e.g., within minutes, hours, or days. In some examples, a DRAM cell is an example of a memory cell that exhibits non-volatile and volatile properties—e.g., based on the short duration during which a DRAM cell retains its state after losing power. In some examples, the duration for which a DRAM cell retains its state may be extended by freezing the memory die that includes DRAM cells.

In some examples, the memory device may include memory die 200. In some examples, the memory die 200 may be used to store sensitive information (e.g., credit card information, personal information, location information, etc.) associated with a host device (or a user of a host device) that is coupled with the memory die 200—e.g., for an application running on the host device. In some examples, an application at the host device may use the memory die 200 to store sensitive information based on the memory die 200 including volatile memory cells (e.g., if memory die 200 is a DRAM device)—e.g., if the memory die 200 includes both volatile and nonvolatile memory cells, an application at the host device may store sensitive information in the volatile memory cells of the memory die 200. In some examples, an application at the host device stores sensitive information in volatile memory cells of the memory die 200 with the understanding that, when the memory die 200 is disconnected from a power source, data previously stored in the memory die 200 will become invalid—e.g. based on the logic states of the memory cells being lost when the power source is disconnected.

In some examples, no (or a small quantity of) volatile memory cells may be included in the memory die 200 for storing application data. In such cases, applications at the host device may either store sensitive information in memory cells having non-volatile and volatile properties or refuse to store data in the memory die 200. If the application stores sensitive information in the memory cells with non-volatile properties, the sensitive information may be left susceptible to unwanted data harvesting attempts (e.g., by cyber criminals). For example, a malicious actor that gains access to the memory die 200 (including after the memory die 200 is disconnected from a power source) may be able to access the data stored by inspecting the logic states retained by the memory cells.

In some examples, to prevent a malicious actor from gaining access to the data stored in the memory die 200, the data stored in the memory die 200 may be erased at power-on, which may undesirably increase a duration of a power-on sequence. In some examples, to prevent a malicious actor from gaining access to the data stored in the memory die 200 and to avoid increasing a duration of the power-on sequence, the data stored in the memory die 200 may be erased at power-off; however, in some examples, the memory device may be unable to erase all of the data before power is lost.

To enable applications that store sensitive data to use a memory die that primarily includes memory cells with non-volatile properties (e.g., memory die 200), techniques for invalidating the data stored in the memory cells may be established. In some examples, after a first event occurs (e.g., a power-on event), one or more scrambling sequences may be generated for one or more addresses of the memory device—e.g., as commands (e.g., read or write commands) associated with accessing memory cells (e.g., a page of memory cells or a prefetch group of memory cells) at the one or more addresses are received. The one or more scrambling sequences may be used to access the memory cells at the one or more addresses—e.g., to scramble data before it is written to the memory cells and to descramble data read from the memory cells. In some examples, after a subsequent event occurs (e.g. another power-on event), one or more different scrambling sequences may be generated for the one or more or more addresses of the memory device, where the different scrambling sequences may be used to access the memory cells at the one or more addresses, thus invalidating data stored in the memory cells.

In some examples, circuitry that implements a hash function is used to generate the one or more scrambling sequences based on the addresses associated with the commands received at the memory device and a first random number generated in response to the occurrence of the event. After the occurrence of the subsequent event, the hash function may also be used to generate the one or more different scrambling sequences based on the addresses associated with second commands received at the memory device and a second random number generated in response to the occurrence of the subsequent event.

Figure 3:
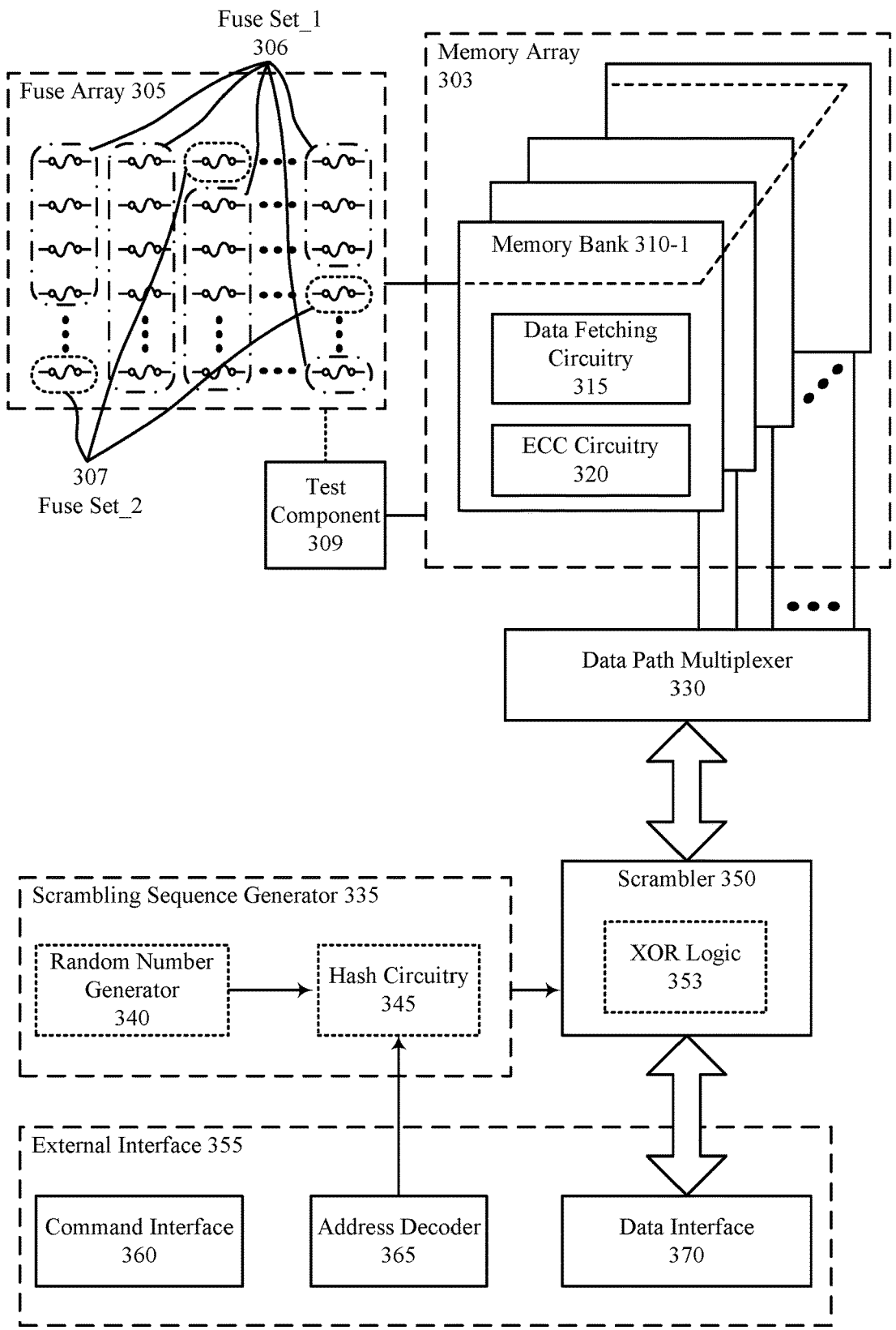
FIG. 3 illustrates an example of a memory device that supports data invalidation for memory in accordance with examples as disclosed herein.

FIG. 3 illustrates an example of a memory device 300 that supports data invalidation for memory in accordance with examples as disclosed herein.

Memory device 300 may be an example of a memory device 110, as described with reference to FIG. 1. Memory device 300 may include external interface 355, scrambling sequence generator 335, scrambler 350, data path multiplexer 330, memory array 303, fuse array 305, and test component 309.

External interface 355 may be configured to interface with a host device (e.g., such as host device 105 of FIG. 1). For example, external interface 355 may be configured to receive and process commands received from the host device. External interface may also be configured to process and store data received from the host device, as well as to retrieve and output data to the host device. External interface 355 may include command interface 360, address decoder 365, and data interface 370.

Command interface 360 may be configured to receive and process commands (e.g., read and write commands) from the host device. In some examples, command interface 360 may be configured to determine a type for a received command—e.g., whether the command is a read or write command, among other commands.

Address decoder 365 may be configured to receive addresses associated with the commands received at command interface 360. In some examples, the addresses are received together with the commands—e.g., on a same bus as the command or as part of the commands. In other examples, the addresses are received separately from the commands—e.g., the addresses may be received on a different bus than the commands. In some examples, memory device 300 may correlate addresses with commands—e.g., based on a time-based relationship between received commands and addresses.

Address decoder 365 may be configured to determine a bank address, a row address, a column address, or any combination thereof, of a received address. A bank address may occupy m bits of the address, a row address may occupy n bits of the address, and the column address may occupy p bits of the address. In some examples, a received address corresponds to a page in the memory device 300. In some examples, a page may include 1024 bits. An address that corresponds to a page may be referred to as a page address. In some examples, a received address corresponds to a portion of a page (e.g., a subpage) in the memory device 300, where the portion of the page may be associated with a prefetch size. In some examples, the portion of the page may include 256 bits. An address that corresponds to a portion of a page may be referred to as a prefetch address.

Data interface 370 may be configured to communicate data between the memory device 300 and the host device. In some examples, data interface 370 may be configured to receive signals from the host device associated with data to be stored in memory device 300. Data interface may also be configured to output signals to the host device associated with data read from memory array 303. Data interface 370 may include a set of pins (e.g., eight conductive pins) that may be coupled with conductive lines (e.g., eight conductive lines) of a data bus. In some examples, data is communicated over data interface 370 in groups of 256 bits.

Scrambling sequence generator 335 may be implemented using circuitry and configured to generate scrambling sequences for addresses of the memory device 300. In some examples, scrambling sequence generator 335 may be configured to generate unique scrambling sequences for each address (or for each group of addresses) of memory device 300—e.g., as the addresses are received. In some examples, after generating a scrambling sequence for an address, scrambling sequence generator 335 may use a same scrambling sequence to access memory cells at the address until an occurrence of an event (e.g., a power-on event or a signaling event). Based on the occurrence of the event, scrambling sequence generator 335 may generate new scrambling sequences for the addresses. In some examples, scrambling sequence generator 335 may receive a signal from within memory device 300 or from a host device that triggers the generation of new scrambling sequences. In some examples, a scrambling sequence generated by scrambling sequence generator 335 may be referred to as a key. If the scrambling sequence is generated for a page address, the scrambling sequence may be referred to as a pageKey. If the scrambling sequence is generated for a prefetch address, the scrambling sequence may be referred to as a prefetchKey. Scrambling sequence generator 335 may include random number generator 340 and hash circuitry 345.

Random number generator 340 may randomly generate a number based on the occurrence of an event (e.g., a power-on event or a signaling event). In some examples, random number generator 340 may generate a new random number after receiving a signal that triggers the generation of the new random number—e.g., if an application at the host device sends a signal to invalidate the data stored in the memory device 300 for the application. Random number generator 340 may be implemented in circuitry (analog or digital) or in code. In some examples, the random number may include a quantity of bits (e.g., 16 bits, 32, bits, 64 bit), where an increased quantity of bits may increase a security associated with scrambling data communicated between the memory device 300 and a host device.

Hash circuitry 345 may be configured to generate a scrambling sequence based on a random number and an address. Hash circuitry 345 may be configured so that small changes (e.g., changing a single bit of the random number, changing a value of the random number by a single digit, etc.) to the inputs of hash circuitry 345 result in large changes to an output of hash circuitry 345. Also, hash circuitry 345 may be configured so that the output of the hash function is repeatable for a same set of inputs. Thus, if the random number is not changed, hash circuitry 345 may generate a same scrambling sequence for an address of memory device 300. But if the random number is changed (e.g., by a small amount, such as by changing one bit), hash circuitry 345 may generate a substantially different scrambling sequence (e.g., more than a third of the bits may be changed, a difference in the values of the scrambling sequences may be greater than a third of a difference between a smallest and greatest value possible for a scrambling sequence, etc.) for the same address. Additionally, reverse engineering the hash function of the hash circuitry 345 based on known inputs and outputs may be extremely difficult.

Hash circuitry 345 may be implemented in circuitry. For example, hash circuitry 345 may be implemented using a circuit that includes a multiplexer and an exclusive OR (XOR) gate. In some examples, a random number generated by random number generator 340 and an address decoded by address decoder 365 may be input to the multiplexer, where an output of the multiplexer and the address may be input to the XOR gate. Such a circuit may be reproduced within a first scrambling level and in subsequent scrambling levels. In some examples, the outputs of the circuits in a first scrambling level and the inputs of the circuits in a second scrambling level may be randomly connected to one another (e.g., during a wiring process). In such cases, hash circuits in different memory devices may implement different hash functions than one another in a randomized fashion. In some examples, an address and random number may be combined before being input to the hash function (in which case the hash function may have a single input). For example, the address and random number may be added together, multiplied with one another, the random number may be appended to the address, etc.

Scrambler 350 may be implemented using circuitry and configured to scramble/descramble data communicated between memory device 300 and the host device based on the scrambling sequence output by scrambling sequence generator 335. Scrambler 350 may include XOR logic 353 that applies an XOR function to data received from the host device (e.g., via data interface 370) and the scrambling sequence when data is written to memory device 300—e.g., to scramble data before it is stored in memory device 300. Also, XOR logic 353 may apply an XOR function to data retrieved from the memory array 303 and the scrambling sequence when data is read from memory device 300—e.g., to scramble data read from the memory array 303 before it is output to the host device (e.g., via data interface 370). In some examples, XOR logic 353 may include a set of XOR gates (e.g., 128 logic gates, 256 logic gates, etc.), where a first input of an XOR logic gate may be receive a bit of a data packet received from data interface and a bit of a scrambling sequence received from scrambling sequence generator 335. In some examples, a bit of the scrambling sequence may be provided to multiple XOR logic gates.

Data path multiplexer 330 may be used to route data between an appropriate portion of memory array 303 (e.g., the memory bank associated with the data, or the memory bank, row, and column indicated by the address associated with the data) and scrambler 350. In some examples, data path multiplexer 330 identifies the memory bank associated with data to be written to or read from memory array 303 and circuitry in the memory bank accesses the appropriate portion of memory array 303.

Memory array 303 may be configured to store data. Memory array 303 may include one or more arrays of memory cells. In some examples, memory array 303 includes memory cells that exhibit non-volatile properties (e.g., both non-volatile and volatile properties). For example, memory array 303 may include FeRAM cells. In some example, memory array 303 may include DRAM cells, which may exhibit non-volatile properties for momentary durations in normal operation or longer durations when subjected to reduced temperatures. The memory cells in memory array 303 may be grouped into memory banks 310. The memory banks 310 may include data fetching circuitry and error correcting circuitry. For examples, first memory bank 310-1 may include data fetching circuitry 315 and error correction circuitry 320. Data fetching circuitry 315 may be configured to retrieve portions of data from a memory page based on a received prefetch address. Error correction circuitry 320 may be configured to detect and/or enable the detection of errors in data stored in or retrieved from first memory bank 310-1. In some examples, error correction circuitry 320 may be configured to generate error correcting bits before a set of data is stored in memory device 300, where the error correcting bits may be used to detect and/or correct errors retrieved from memory device 300.

Fuse array 305 may be configured to store memory addresses that are used to repair (e.g., instead of) defective memory addresses in the memory banks 310. The memory addresses used to repair the defective memory address may be referred to as repair addresses and may be accessed instead of the defective memory address. Fuse array 305 may include an array of fuses, where data may be permanently (e.g., by melting a wire connecting two terminal of the fuse) or semi-permanently (e.g., in a not readily changed manner) stored in the fuses. Fuse array 305 may include a first set of fuses 306 and a second set of fuses 307. The second set of fuses 307 may be distributed across the first set of fuses (e.g., in an asymmetric manner). The first set of fuses 306 may be configured to store repair addresses.

Fuse array 305 may broadcast the information stored in the fuses to all of the memory banks 310 in memory array 303—e.g., in a fuse broadcast sequence. The fuse broadcast sequence may be timed so that the sequentially broadcast fuse information is stored in the proper memory banks. In some examples, fuse array 305 may store a code that is used to disable the scrambling functionality of memory device 300 (e.g., in the second set of fuses 307), where the code may be included in the fuse broadcast sequence. In some examples, the bits of the code (e.g., 0100110100) may be non-sequentially distributed in different parts of the fuse broadcast sequence. In some examples, a controller at memory device 300 disables at least one of scrambling sequence generator or scrambler 350 based on detecting the code.

Test component 309 may be configured to facilitate a testing procedure at memory device 300. In some examples, test component 309 may be configured to activate a test mode at memory device 300. In some examples, test component 309 may be configured to trigger fuse array 305 to transmit a fuse broadcast sequence including repair information and a code for disabling the scrambling feature—e.g., for disabling or bypassing scrambling sequence generator 335, scrambler 350, or both.

Figure 4:
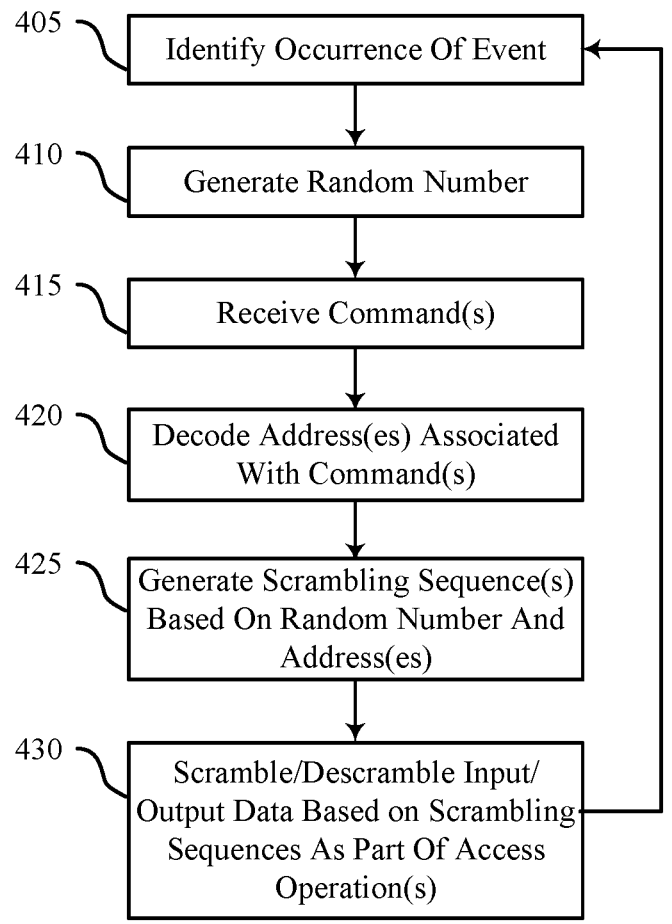
FIGS. 4 and 5 illustrate examples of flow charts that support data invalidation for memory in accordance with examples as disclosed herein.

FIG. 4 illustrates an example of a flowchart 400 that supports data invalidation for memory in accordance with examples as disclosed herein.

Flowchart 400 may be performed by a memory device, such as memory device 110 or memory device 300 of FIGS. 1 and 3. In some examples, flowchart 400 illustrates an exemplary set of operations performed to support techniques for invalidating data stored in memory. For example, flowchart 400 depicts operations for generating unique scrambling sequences for addresses as commands are received and using the scrambling sequences to access memory cells at the addresses.

It is understood that one or more of the operations described in flowchart 400 may be performed earlier or later in the process, omitted, replaced, supplemented, or combined with another operation. Also, additional operations described herein that are not included in flowchart 400 may be included.

At block 405, an occurrence of an event may be identified—e.g. by the memory device or a random number generator (e.g., random number generator 340 of FIG. 3). In some examples, the identified event is a power-on event—e.g., which may occur if a voltage of a power supply rail exceeds a threshold, or a current level exceeds a threshold. In some examples, a power circuit in the memory device identifies the power-on event and sends a signal to random number generator 340. In some examples, the identified event is a security event—e.g., a security component in the memory device may detect a malicious attempt to steal data from the memory device. In some examples, the identified event is an application-driven event—e.g., an application at a host device may send a signal indicating that the data stored in the memory device is no longer used by the application. In some examples, the identified event is a timer-based event—e.g., a timer that was initiated when a set of data was stored in the memory device may expire.

At block 410, a random number may be generated (e.g., by the random number generator) based on an occurrence of one or more of the events described above. The randomly generated number may replace a previously generated random number and be used (e.g., by a scrambling sequence generator, such as scrambling sequence generator 335 of FIG. 3) for the subsequent generation of scrambling sequences. Based on generating the new random number, data currently stored in the memory device may be invalidated—e.g., as a new set of scrambling sequences generated based on the new random number may be used to scramble/descramble data stored in the memory device. In some examples, a quantity of bits included in the random number is based on a desired security level of the device. In some examples, to increase security, the quantity of bits included in the random number may be increased (e.g., from 32 bit to 128 bits).

At block 415, one or more commands may be received from a host device—e.g., at a command interface of the memory device (e.g., command interface 360 of FIG. 3). In some examples, the commands may include addresses at which the command is to be executed. In other examples, addresses may be separately received at the memory device, where the addresses may be correlated with the commands—e.g., based on a time-based relationship. The one or more commands may include read commands, write commands, or both, among other types of commands.

At block 420, the one or more addresses associated with the commands may be decoded—e.g., by address decoder 365 of FIG. 3. In some examples, the one or more addresses are used to address a page of memory. In other examples, the one or more addresses are used to address a subpage of memory. The one or more addresses may include a first portion that indicates a bank address, a second portion that indicates a row address, and a third portion that indicates a column address. In some examples, the decoded one or more addresses may be provided to the scrambling sequence generator.

At block 425, one or more scrambling sequences (which may be referred to as keys) may be generated (e.g., by the scrambling sequence generator) based on the random number and the one or more addresses. In some examples, a scrambling sequence is generated for each command/address pair received at the memory device. For example, after receiving a first command at the memory device, the scrambling sequence generator may generate a first scrambling sequence based on a first address associated with the first command and the random number. Subsequently, for a next command received at the memory device, the scrambling sequence generator may generate a second scrambling sequence based on a second address associated with the second command and the random number. In some examples, the first address and the second address are the same, and thus, the first scrambling sequence and the second scrambling sequence are the same.

In some examples, the scrambling sequence generator generates unique scrambling sequences for each address in the memory device—e.g., if the memory device includes 200 million unique prefetch addresses, the scrambling sequence generator may generate 200 million unique scrambling sequences. In other examples, the scrambling sequence generator generates unique scrambling sequences for groups of address in the memory device—e.g., if the memory device includes 200 million unique prefetch addresses, the scrambling sequence generator may generate 100 million unique scrambling sequences. In some examples, a group of addresses may include consecutive address—e.g., addresses that are in a same bank and row as one another. Generating scrambling sequences for groups of addresses may allow scrambling sequences to be used for a threshold quantity of addresses, which may decrease a complexity associated with generating the scrambling sequences.

A quantity of bits included in the scrambling sequences may be based on a size of data that is communicated between the memory device and the host device. For example, if the data communicated between the memory device and the host device includes 256 bits, the scrambling sequences may include 256 bits. In other examples, if the data communicated between the memory device and the host device includes 256 bits, the scrambling sequences may include 128 bits—in such cases, each bit of the scrambling sequence may be used to randomly flip (or not flip) two bits of the data. Using smaller scrambling sequences may decrease a complexity associated with generating the scrambling sequences.

In some examples, scrambling sequences may only be generated for certain memory banks—e.g., high security memory banks. Applications at a host device may determine a location of the high security memory banks and store sensitive information in the high security memory banks with the understanding that data in the high security memory banks will be invalidated after the occurrence of an event (e.g., an application-initiated or environment-initiated event).

In some examples, a hash function (e.g., which may be implemented by circuitry such as hash circuitry 345 of FIG. 3) is included in the scrambling sequence generator and used to generate the one or more scrambling sequences based on the random number and the one or more addresses. In some examples, the hash function generates a different set of scrambling sequences for a same set of addresses based on a new random number, where a change in the random number relative to the prior random number may be small—a single bit may be flipped, a difference between the values of the random number may be one, etc.). In some examples, the different set of scrambling sequences may be substantially different than the previous set of scrambling sequences for the same set of addresses—e.g., each address may be associated with a new scrambling sequence that has multiple flipped bits relative to the prior scrambling sequence.

At block 430, data being input to the memory device may be scrambled based on the scrambling sequence—e.g., by a scrambler, such as scrambler 350 of FIG. 3. Additionally, or alternatively, data being output from the memory device may be descrambled based on the scrambling sequence—e.g., also by the scrambler, which in such cases, may operate as a descrambler. In some examples, a scrambling sequence that is used to scramble data before it is written to memory cells at an address of the memory device is also used to descramble data read from the memory cells at the address of the memory device. In some examples, data corresponding to a command (e.g., a write command) may be received after (or concurrently with) one or more of receiving the command, decoding an associated address, and generating a scrambling sequence for the associated address. The data and the scrambling sequence may be input to the scrambler, and the scrambler may output scrambled data. The scrambled data, along with address information, may be passed to a data path multiplexer which may route the scrambled data to the memory cells at the associated address. Subsequently, another command (e.g., a read command) associated with the same address may be received. In such cases, the same scrambling sequence may be generated, and the memory device may retrieve the scrambled data from the memory cells at the address. The scrambled data and the scrambling sequence may be applied to the scrambler, which may output (e.g., via the data interface) descrambled data that matches the originally received data. Data may be similarly written to memory cells at other addresses of the memory device and read from memory cells at addresses of the memory device storing valid data.

In some examples, scrambling sequences may be generated on a per command basis. Thus, the scrambling sequences may be generated and applied to corresponding sets of data being input to or output from the memory device in real time. In some examples, generated scrambling sequences for recently received memory addresses may be cached and accessed if a memory address in the cache is received—e.g., instead of recomputing the scrambling sequence.

In some examples, after performing the operations described at block 430, an event associated with invalidating data at the memory device may occur. In such cases, the memory device may identify the occurrence of the event, as similarly described with reference to block 405. In such examples, after identifying the occurrence of the event, the memory device may repeat the operations described at block 410 to block 430. In such cases, a new random number may be generated based on the occurrence of the event, as similarly described with reference to block 410. Also, new scrambling sequences may be generated for addresses of the memory device based on the generation of the new random number, as similarly described with reference to block 415 through block 425—e.g., a scrambling sequence generated for an address before the event may be different (e.g., substantially) than a scrambling sequence generated for the address after the event. And the new scrambling sequences may be used to input data to and output data from the memory device, as similarly described with reference to 430.

Figure 5:
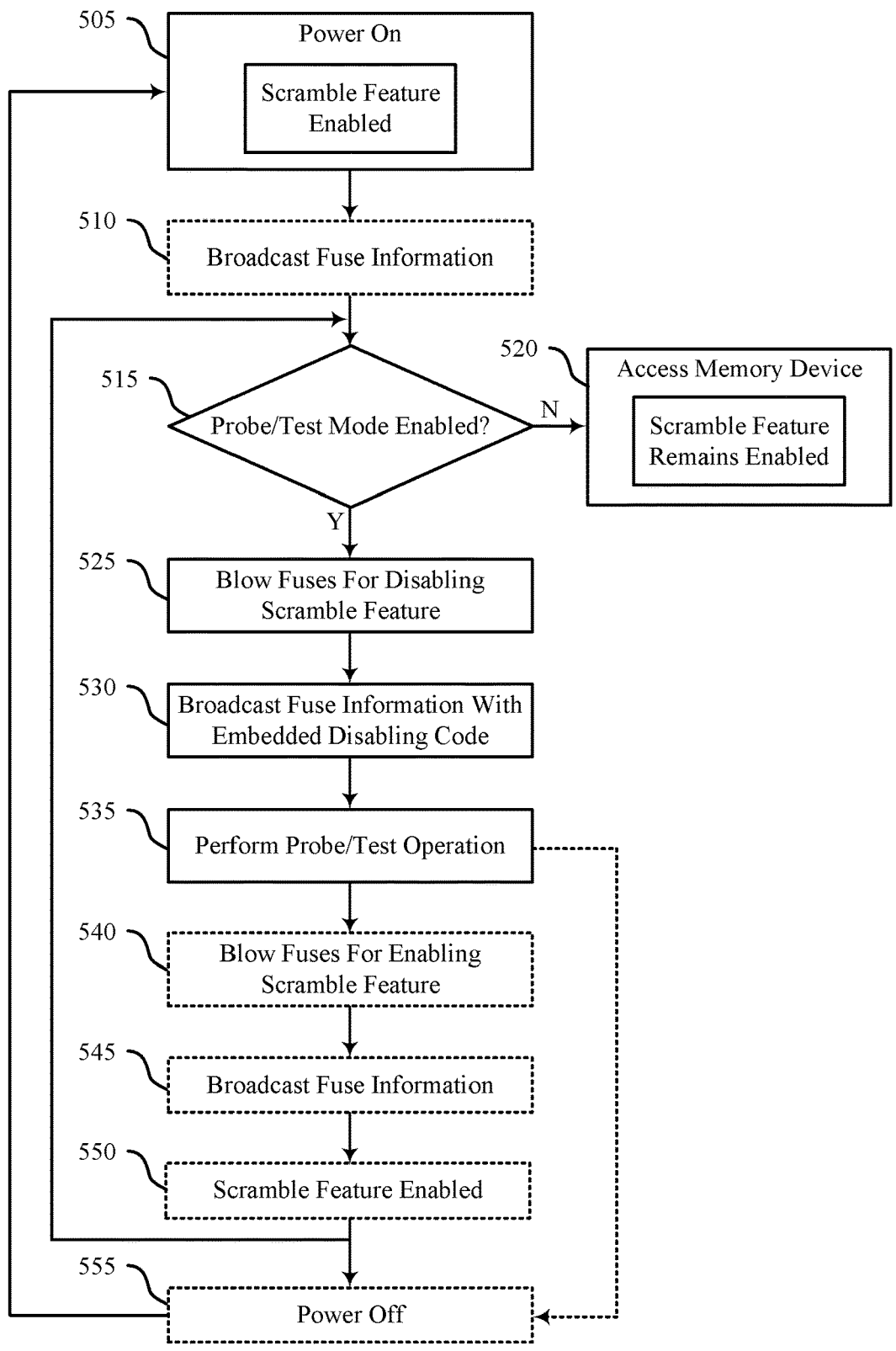

FIG. 5 illustrates an example of a flowchart 500 that supports data invalidation for memory in accordance with examples as disclosed herein.

Flowchart 500 may be performed by a memory device, such as memory device 110 or memory device 300 of FIGS. 1 and 3. In some examples, flowchart 500 illustrates an exemplary set of operations performed to support data invalidation for memory. For example, flowchart 500 depicts operations for disabling a scrambling feature (e.g., the scrambling feature described with reference to FIGS. 1 through 3) of the memory device in a secure fashion.

It is understood that one or more of the operations described in flowchart 500 may be performed earlier or later in the process, omitted, replaced, supplemented, or combined with another operation. Also, additional operations described herein that are not included in flowchart 500 may be included.

At block 505, power may be supplied to the memory device. In some examples, the memory device may perform a power-on sequence based on power being supplied to the memory device. In some examples, as part of the power-on sequence, a signal is sent to a random number generator of a scrambling sequence generator that triggers the random number to randomly generate a number. Also, as a default, the circuitry associated with scrambling/descrambling data that is being written to or read from the memory device may be enabled when power is supplied to the memory device.

At block 510, fuse information may be broadcast—e.g., to the memory banks in the memory device. The fuse information may include repair information that indicates an address of defective memory cells as well as an address of repair memory cells that are used instead of the defective memory cells. The fuse information may be broadcast to the memory banks in a broadcast sequence that ensures that the appropriate fuse information is stored in an appropriate memory bank—e.g., by passing a token from one memory bank to another.

At diamond 515, it may be determined whether a probe or test mode is enabled for the memory device. When a probe or test mode is enabled for the memory device, it may be important that the data written to the memory device is the same as the data stored in the memory device—that is, it may be important that the data is not scrambled. Thus, a procedure for selectively disabling the scrambling feature described herein may be desired. At the same time, a technique for obfuscating the procedure used to disable the scrambling feature may be important to prevent malicious actors from using the technique to disable the scrambling feature, bypassing the protection provided by the scrambling feature. In some examples, if the memory device is not in a probe or test mode, the memory device may perform the operations described at block 520. Otherwise, the memory device may perform all (or a subset of) the operations described at block 525 to block 555.

At block 520, the memory banks may be accessed based on the scrambling procedure described with reference to FIG. 4. That is, unique scrambling sequences may be generated for addresses associated with commands received at the memory device, and the scrambling sequences may be used to scramble/descramble data written to/read from the memory device. Also, a new random number and set of scrambling sequences may be generated if an invalidity event (e.g., power-on, a timer expiration, a reception of an invalidity signal, etc.) occurs at the memory device. In some examples, the operations described at block 510 is performed after determining that neither a probe nor test mode is enabled—e.g., to avoid duplicate fuse broadcast sequences from being performed.

At block 525, a set of fuses associated with disabling the scrambling feature may be accessed. The set of fuses may store a code (which may be referred to as a disabling code) that, when received at the memory device, causes the memory device to disable the scrambling feature. In some examples, the set of fuses is distributed across a fuse array.

At block 530, the fuse information may be broadcast in the fuse broadcast sequence, where the disabling code may be embedded in the fuse broadcast sequence. In some examples, different bits of the disabling code are transmitted in different portions of the fuse broadcast sequence, where the position of the bits of the disabling code may be known to a controller of the memory device. In some examples, the different bits of the disabling code are non-sequentially transmitted in the broadcast sequence—e.g., so that an initially transmitted bit of the code that is transmitted in a first portion of the broadcast sequence may correspond to a subsequent bit of the code (e.g., a third bit of the code), and so on.

At block 535, the probe or test operation may be performed. In such cases, data may be written to or read from the memory device without being scrambled or descrambled.

At block 540, a set of fuses associated with enabling the scrambling sequence may be accessed. In some examples, the set of fuses associated with enabling the scrambling sequence are the same as the set of fuses associated with disabling the scrambling sequence. In some examples, the set of fuses associated with enabling the scrambling sequence are different than the set of fuses associated with disabling the scrambling sequence—in such cases, the set of fuses associated with enabling the scrambling sequence may store an enabling code.

At block 545, a subsequent fuse broadcast sequence may be performed, where the enabling code may be embedded in the fuse broadcast sequence.

At block 550, the memory device may enable the scrambling feature based on decoding the enabling code. In some examples, after enabling the scrambling feature, the memory device may check to determine whether a new probe or test mode is enabled before entering an operating mode that used the scrambling feature.

At block 555, power may be removed from the memory device. Subsequently, power may be supplied to the memory device, in which case, the memory device may repeat the above operations starting at block 505.

Figure 6:
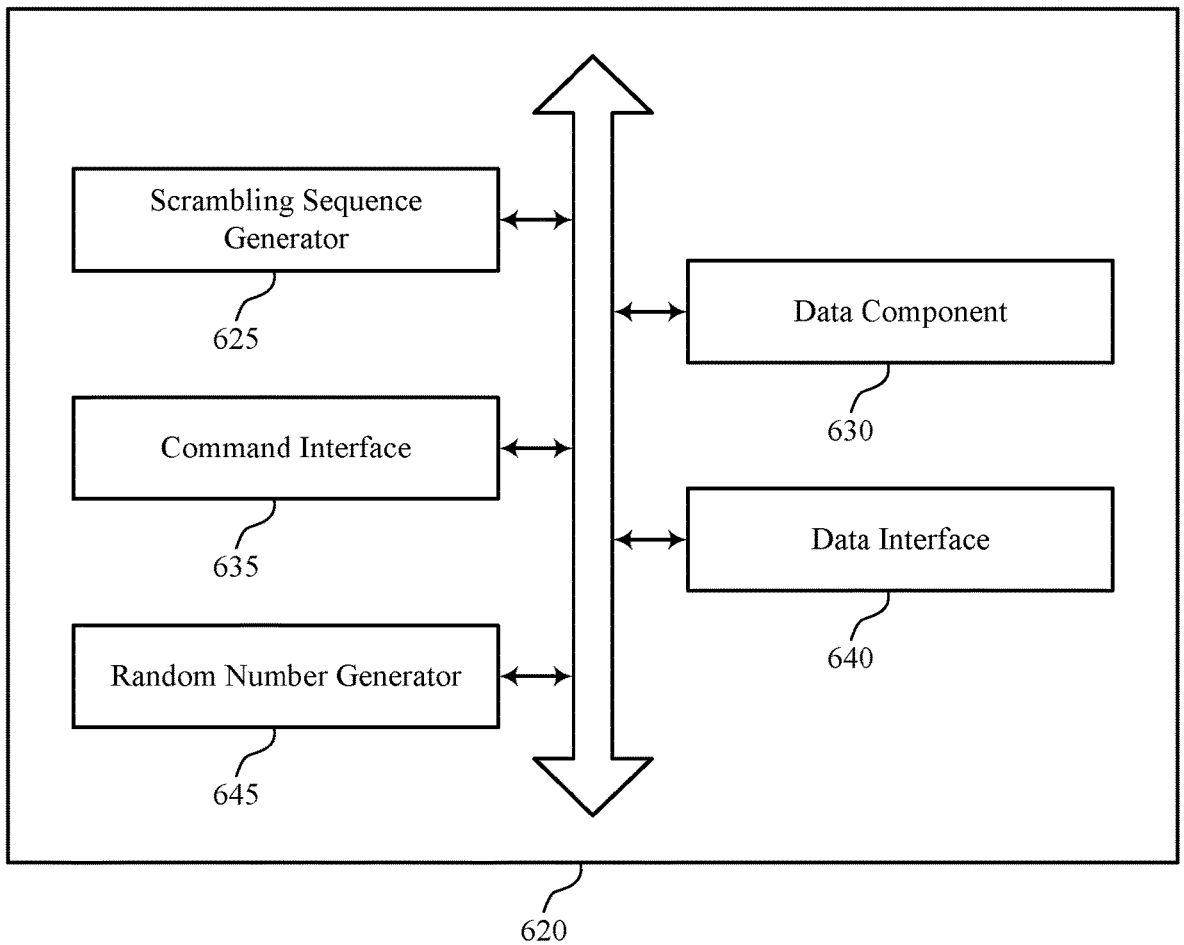
FIG. 6 shows a block diagram of a memory array that supports data invalidation for memory in accordance with examples as disclosed herein.

FIG. 6 shows a block diagram 600 of a memory array 620 that supports data invalidation for memory in accordance with examples as disclosed herein. The memory array 620 may be an example of aspects of a memory device as described with reference to FIGS. 1 through 5. The memory array 620, or various components thereof, may be an example of means for performing various aspects of data invalidation for memory as described herein. For example, the memory array 620 may include a scrambling sequence generator 625, a data component 630, a command interface 635, a data interface 640, a random number generator 645, or any combination thereof. Each of these components may communicate, directly or indirectly, with one another (e.g., via one or more buses).

The scrambling sequence generator 625 may be configured as or otherwise support a means for generating, after a first event, a first set of scrambling sequences for a plurality of addresses received in association with a first plurality of commands. The data component 630 may be configured as or otherwise support a means for accessing, in response to the first plurality of commands, portions of a memory array based at least in part on the first set of scrambling sequences, the portions of the memory array corresponding to the plurality of addresses. In some examples, the scrambling sequence generator 625 may be configured as or otherwise support a means for generating, after a subsequent event, a second set of scrambling sequences for the plurality of addresses as received in association with a second plurality of commands, the second set of scrambling sequences being different than the first set of scrambling sequences. In some examples, the data component 630 may be configured as or otherwise support a means for accessing, in response to the second plurality of commands, the portions of the memory array based at least in part on the second set of scrambling sequences. In some examples, data stored in the memory array prior to the subsequent event is invalidated based at least in part on generating the second set of scrambling sequences.

In some examples, the command interface 635 may be configured as or otherwise support a means for receiving a command of the first plurality of commands associated with an address of the plurality of addresses, where generating the first set of scrambling sequences includes generating a scrambling sequence based at least in part on the address. In some examples, the data interface 640 may be configured as or otherwise support a means for receiving a set of data associated with the command and the address, where accessing the portions of the memory array based at least in part on the first set of scrambling sequences includes scrambling the set of data using the scrambling sequence to obtain a scrambled set of data; and writing the scrambled set of data to a portion of the memory array that corresponds to the address.

In some examples, the command interface 635 may be configured as or otherwise support a means for receiving a second command of the first plurality of commands associated with the address of the plurality of addresses, where accessing the portions of the memory array based at least in part on the first set of scrambling sequences includes retrieving the scrambled set of data from the portion of the memory array based at least in part on receiving the second command; descrambling the scrambled set of data using the scrambling sequence to obtain the set of data; and outputting the set of data in response to the second command.

In some examples, a size of the scrambling sequence is equivalent to a size of the set of data, and each bit of the scrambling sequence corresponds to a respective bit of the set of data. In some examples, a size of the scrambling sequence is less than a size of the set of data, and each bit of the scrambling sequence corresponds to a respective plurality of bits of the set of data.

In some examples, to support generating the first set of scrambling sequences, the random number generator 645 may be configured as or otherwise support a means for randomly generating a number based at least in part on an occurrence of the first event. In some examples, to support generating the first set of scrambling sequences, the scrambling sequence generator 625 may be configured as or otherwise support a means for inputting the number and the plurality of addresses to a hash function, where the hash function outputs the first set of scrambling sequences based at least in part on the number and the plurality of addresses.

In some examples, to support generating the second set of scrambling sequences, the random number generator 645 may be configured as or otherwise support a means for randomly generating a second number based at least in part on an occurrence of the subsequent event. In some examples, to support generating the second set of scrambling sequences, the scrambling sequence generator 625 may be configured as or otherwise support a means for inputting the second number and the plurality of addresses to the hash function, where the hash function outputs the second set of scrambling sequences based at least in part on the second number and the plurality of addresses. In some examples, the first event includes a first power-on sequence, and the subsequent event includes a second power-on sequence.

In some examples, the scrambling sequence generator 625 may be configured as or otherwise support a means for receiving a signal for invalidating data stored in the memory array, where the subsequent event includes receiving the signal.

In some examples, the scrambling sequence generator 625 may be configured as or otherwise support a means for enabling a mode associated with scrambling data communicated to or from the memory array based at least in part on an occurrence of a power-on sequence. In some examples, the scrambling sequence generator 625 may be configured as or otherwise support a means for disabling the mode based at least in part on a code included in a fuse broadcast sequence. In some examples, the data component 630 may be configured as or otherwise support a means for accessing, in response to a third plurality of commands, the portions of the memory array without scrambling data communicated to or from the memory array based at least in part on disabling the mode.

In some examples, the scrambling sequence generator 625 may be configured as or otherwise support a means for reenabling the mode based at least in part on a second code included in a second fuse broadcast sequence, an occurrence of a second power-on sequence, or both, where generating the first set of scrambling sequences is based at least in part on reenabling the mode.

In some examples, after the first event, each scrambling sequence of the first set of scrambling sequences corresponds to a respective address of the plurality of addresses, and after the subsequent event, each scrambling sequence of the second set of scrambling sequences corresponds to a respective address of the plurality of addresses.

Figure 7:
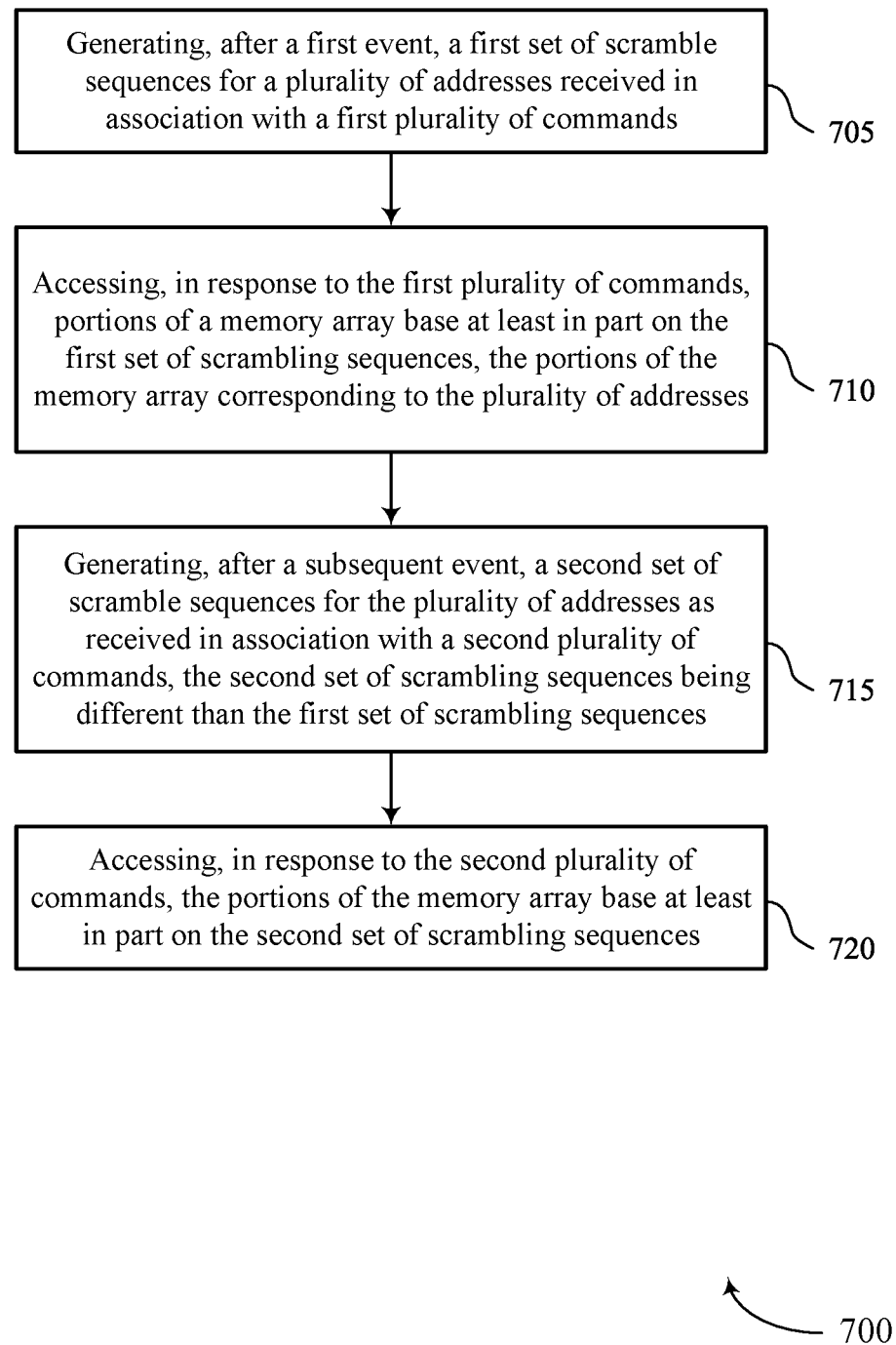
FIG. 7 shows a flowchart illustrating a method or methods that support data invalidation for memory in accordance with examples as disclosed herein.

FIG. 7 shows a flowchart illustrating a method 700 that supports data invalidation for memory in accordance with examples as disclosed herein. The operations of method 700 may be implemented by a memory array or its components as described herein. For example, the operations of method 700 may be performed by a memory array as described with reference to FIGS. 1 through 6. In some examples, a memory array may execute a set of instructions to control the functional elements of the device to perform the described functions. Additionally, or alternatively, the memory array may perform aspects of the described functions using special-purpose hardware.

At 705, the method may include generating, after a first event, a first set of scrambling sequences for a plurality of addresses received in association with a first plurality of commands. The operations of 705 may be performed in accordance with examples as disclosed herein. In some examples, aspects of the operations of 705 may be performed by a scrambling sequence generator 625 as described with reference to FIG. 6.

At 710, the method may include accessing, in response to the first plurality of commands, portions of a memory array based at least in part on the first set of scrambling sequences, the portions of the memory array corresponding to the plurality of addresses. The operations of 710 may be performed in accordance with examples as disclosed herein. In some examples, aspects of the operations of 710 may be performed by a data component 630 as described with reference to FIG. 6.

At 715, the method may include generating, after a subsequent event, a second set of scrambling sequences for the plurality of addresses as received in association with a second plurality of commands, the second set of scrambling sequences being different than the first set of scrambling sequences. The operations of 715 may be performed in accordance with examples as disclosed herein. In some examples, aspects of the operations of 715 may be performed by a scrambling sequence generator 625 as described with reference to FIG. 6.

At 720, the method may include accessing, in response to the second plurality of commands, the portions of the memory array based at least in part on the second set of scrambling sequences. The operations of 720 may be performed in accordance with examples as disclosed herein. In some examples, aspects of the operations of 720 may be performed by a data component 630 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for generating, after a first event, a first set of scrambling sequences for a plurality of addresses received in association with a first plurality of commands, accessing, in response to the first plurality of commands, portions of a memory array based at least in part on the first set of scrambling sequences, the portions of the memory array corresponding to the plurality of addresses, generating, after a subsequent event, a second set of scrambling sequences for the plurality of addresses as received in association with a second plurality of commands, the second set of scrambling sequences being different than the first set of scrambling sequences, and accessing, in response to the second plurality of commands, the portions of the memory array based at least in part on the second set of scrambling sequences.

Some examples of the method 700 and the apparatus described herein may further include operations, features, circuitry, logic, means, or instructions for receiving a command of the first plurality of commands associated with an address of the plurality of addresses, where generating the first set of scrambling sequences includes generating a scrambling sequence based at least in part on the address and receiving a set of data associated with the command and the address, where accessing the portions of the memory array based at least in part on the first set of scrambling sequences includes scrambling the set of data using the scrambling sequence to obtain a scrambled set of data; and writing the scrambled set of data to a portion of the memory array that corresponds to the address.

Some examples of the method 700 and the apparatus described herein may further include operations, features, circuitry, logic, means, or instructions for receiving a second command of the first plurality of commands associated with the address of the plurality of addresses, where accessing the portions of the memory array based at least in part on the first set of scrambling sequences includes retrieving the scrambled set of data from the portion of the memory array based at least in part on receiving the second command; descrambling the scrambled set of data using the scrambling sequence to obtain the set of data; and outputting the set of data in response to the second command.

In some examples of the method 700 and the apparatus described herein, a size of the scrambling sequence may be equivalent to a size of the set of data, and each bit of the scrambling sequence corresponds to a respective bit of the set of data.

In some examples of the method 700 and the apparatus described herein, a size of the scrambling sequence may be less than a size of the set of data, and each bit of the scrambling sequence corresponds to a respective plurality of bits of the set of data.

In some examples of the method 700 and the apparatus described herein, generating the first set of scrambling sequences may include operations, features, circuitry, logic, means, or instructions for randomly generating a number based at least in part on an occurrence of the first event and inputting the number and the plurality of addresses to a hash function, where the hash function outputs the first set of scrambling sequences based at least in part on the number and the plurality of addresses.

In some examples of the method 700 and the apparatus described herein, generating the second set of scrambling sequences may include operations, features, circuitry, logic, means, or instructions for randomly generating a second number based at least in part on an occurrence of the subsequent event and inputting the second number and the plurality of addresses to the hash function, where the hash function outputs the second set of scrambling sequences based at least in part on the second number and the plurality of addresses.

In some examples of the method 700 and the apparatus described herein, the first event includes a first power-on sequence, and the subsequent event includes a second power-on sequence.

Some examples of the method 700 and the apparatus described herein may further include operations, features, circuitry, logic, means, or instructions for receiving a signal for invalidating data stored in the memory array, where the subsequent event includes receiving the signal.

Some examples of the method 700 and the apparatus described herein may further include operations, features, circuitry, logic, means, or instructions for enabling a mode associated with scrambling data communicated to or from the memory array based at least in part on an occurrence of a power-on sequence, disabling the mode based at least in part on a code included in a fuse broadcast sequence, and accessing, in response to a third plurality of commands, the portions of the memory array without scrambling data communicated to or from the memory array based at least in part on disabling the mode.

Some examples of the method 700 and the apparatus described herein may further include operations, features, circuitry, logic, means, or instructions for reenabling the mode based at least in part on a second code included in a second fuse broadcast sequence, an occurrence of a second power-on sequence, or both, where generating the first set of scrambling sequences may be based at least in part on reenabling the mode.

In some examples of the method 700 and the apparatus described herein, data stored in the memory array prior to the subsequent event may be invalidated based at least in part on generating the second set of scrambling sequences.

In some examples of the method 700 and the apparatus described herein, after the first event, each scrambling sequence of the first set of scrambling sequences corresponds to a respective address of the plurality of addresses, and after the subsequent event, each scrambling sequence of the second set of scrambling sequences corresponds to a respective address of the plurality of addresses.

It should be noted that the methods described herein are possible implementations, and that the operations and the steps may be rearranged or otherwise modified and that other implementations are possible. Furthermore, portions from two or more of the methods may be combined.

Another apparatus is described. The apparatus may include a memory array (e.g., memory array 303), first circuitry (e.g., scrambling sequence generator 335) configured to generate, after a first event, a first set of scrambling sequences for a plurality of addresses of the memory array, and after a subsequent event, a second set of scrambling sequences for the plurality of addresses that is different than the first set of scrambling sequences, and second circuitry (e.g., scrambler 350) coupled with the memory array and the first circuitry, the second circuitry configured to scramble data associated with the plurality of addresses based at least in part on the first set of scrambling sequences after the first event and based at least in part on the second set of scrambling sequences after the subsequent event.

In some examples, the apparatus may include an external interface (e.g., external interface 355) coupled with the second circuitry, where the second circuitry may be further configured to scramble data communicated between the memory array and the external interface.

In some examples of the apparatus, the first circuitry includes third circuitry (e.g., random number generator 340) configured to randomly generate a number based at least in part on an occurrence of an event and fourth circuitry (e.g., hash circuitry 345) coupled with the third circuitry and configured to implement a hash function, the fourth circuitry configured to output scrambling sequences based at least in part on a most recent number received from the third circuitry, the plurality of addresses, and the hash function.

In some examples of the apparatus, the second circuitry includes exclusive OR logic (e.g., XOR logic 353) configured to apply a scrambling sequence generated by the first circuitry for an address to a set of data that may be associated with a same command as the address.

In some examples, the apparatus may include a fuse array (e.g., fuse array 305) including a first set of fuses (e.g., the first set of fuses 306) including repair information indicating first addresses in the memory array that may be defective; and a second set of fuses (e.g., the second set of fuses 307) including a code for disabling a mode associated with scrambling data communicated to and from the memory array, where the fuse array may be configured to broadcast the repair information, the code, or both, to the memory array.

In some examples, the apparatus may include a test component (e.g., test component 309) coupled with the fuse array and configured, to disable the mode, to trigger a fuse broadcast sequence including the code and the repair information, where bits of the code may be non-sequentially transmitted during the fuse broadcast sequence.

In some examples of the apparatus, at least one of the first circuitry and the second circuitry may be further configured to be disabled based at least in part on the code being broadcasted from the fuse array.

Another apparatus is described. The apparatus may include a memory array (e.g., memory array 303) including memory cells (e.g., memory cells 205), an external interface (e.g., external interface 355) coupled with the memory array and configured to receive commands for accessing the memory array, the commands associated with addresses of the memory array, a random number generator (e.g., random number generator 340) configured to generate a random number based at least in part on an occurrence of an event, first logic (e.g., hash circuitry 345) coupled with the random number generator and the external interface and configured to implement a hash function to obtain a set of scrambling sequences for a set of addresses received from the external interface, where the set of scrambling sequences is based at least in part on the random number, the set of addresses, and the hash function, and second logic (e.g., scrambler 350) coupled with the first logic and configured to scramble, based at least in part on the set of scrambling sequences, data communicated to or from memory cells of the memory array associated with the set of addresses.

In some examples of the apparatus, the external interface includes a command interface (e.g., command interface 360) configured to receive the commands from a host and process the commands, an address component (e.g., which may include address decoder 365) coupled with the first logic and configured to obtain the addresses associated with the commands and provide the addresses to the first logic, and data pins (e.g., as part of data interface 370) coupled with the second logic configured to communicate data between the external interface and the host.

In some examples of the apparatus, the second logic includes exclusive OR logic (e.g., XOR logic 353) configured to combine the set of scrambling sequences with sets of data associated with the set of addresses.

In some examples, the apparatus may include a multiplexer (e.g., data path multiplexer 330) coupled with the second logic and configured to route scrambled sets of data received from the second logic to the memory cells of the memory array associated with the set of addresses.

In some examples, the apparatus may include a fuse array (e.g., fuse array 305) including a set of fuses configured to store a code for disabling a mode associated with scrambling data communicated to or from the memory array.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    generating, after a first event, a first set of scrambling sequences for a plurality of addresses received in association with a first plurality of commands for accessing the plurality of addresses of a memory array;
    accessing, in response to the first plurality of commands, portions of the memory array based at least in part on the first set of scrambling sequences, the portions of the memory array corresponding to the plurality of addresses and comprising scrambled first data, the scrambled first data comprising first data scrambled with the first set of scrambling sequences;
    generating, after a subsequent event, a second set of scrambling sequences for the plurality of addresses as received in association with a second plurality of commands for accessing the plurality of addresses after the subsequent event, the second set of scrambling sequences being different than the first set of scrambling sequences, wherein the scrambled first data stored in the portions of the memory array is rendered invalid as a result of the scrambled first data including the first set of scrambling sequences and as a result of the second set of scrambling sequences being generated; and
    accessing, in response to the second plurality of commands associated with second data, the portions of the memory array after the scrambled first data stored in the portions of the memory array are rendered invalid as the result of the scrambled first data including the first set of scrambling sequences and as a result of the second set of scrambling sequences being generated, wherein the portions of the memory array comprise the second data scrambled with the second set of scrambling sequences.

2. The method of claim 1, further comprising:
    receiving a command of the first plurality of commands associated with an address of the plurality of addresses, wherein generating the first set of scrambling sequences comprises generating a scrambling sequence based at least in part on the address of the plurality of addresses; and
    receiving a set of data associated with the command and the address of the plurality of addresses, wherein accessing the portions of the memory array based at least in part on the first set of scrambling sequences comprises:
        scrambling the set of data using the scrambling sequence to obtain a scrambled set of data, and
        writing the scrambled set of data to a portion of the memory array that corresponds to the address of the plurality of addresses.

3. The method of claim 2, further comprising:
    receiving a second command of the first plurality of commands associated with the address of the plurality of addresses, wherein accessing the portions of the memory array based at least in part on the first set of scrambling sequences comprises:
        retrieving the scrambled set of data from the portion of the memory array based at least in part on receiving the second command,
        descrambling the scrambled set of data using the scrambling sequence to obtain the set of data, and
        outputting the set of data in response to the second command.

4. The method of claim 2, wherein a size of the scrambling sequence is equivalent to a size of the set of data, and each bit of the scrambling sequence corresponds to a respective bit of the set of data.

5. The method of claim 2, wherein a size of the scrambling sequence is less than a size of the set of data, and each bit of the scrambling sequence corresponds to a respective plurality of bits of the set of data.

6. The method of claim 1, wherein generating the first set of scrambling sequences comprises:
    randomly generating a number based at least in part on an occurrence of the first event; and
    inputting the number and the plurality of addresses to a hash function, wherein the hash function outputs the first set of scrambling sequences based at least in part on the number and the plurality of addresses.

7. The method of claim 6, wherein generating the second set of scrambling sequences comprises:
    randomly generating a second number based at least in part on an occurrence of the subsequent event; and inputting the second number and the plurality of addresses to the hash function, wherein the hash function outputs the second set of scrambling sequences based at least in part on the second number and the plurality of addresses.

8. The method of claim 1, wherein:
the first event comprises a first power-on sequence; and
the subsequent event comprises a second power-on sequence.

9. The method of claim 1, further comprising:
receiving a signal for invalidating data stored in the memory array, wherein the subsequent event comprises receiving the signal.

10. The method of claim 1, further comprising:
enabling a mode associated with scrambling data communicated to or from the memory array based at least in part on an occurrence of a power-on sequence;
disabling the mode based at least in part on a code included in a fuse broadcast sequence; and
accessing, in response to a third plurality of commands, the portions of the memory array without scrambling data communicated to or from the memory array based at least in part on disabling the mode.

11. The method of claim 10, further comprising:
reenabling the mode based at least in part on a second code included in a second fuse broadcast sequence, an occurrence of a second power-on sequence, or both, wherein generating the first set of scrambling sequences is based at least in part on reenabling the mode.

12. The method of claim 1, wherein, after the first event, each scrambling sequence of the first set of scrambling sequences corresponds to a respective address of the plurality of addresses, and after the subsequent event, each scrambling sequence of the second set of scrambling sequences corresponds to a respective address of the plurality of addresses.

13. An apparatus, comprising:
a memory array;
first circuitry configured to generate, after a first event, a first set of scrambling sequences for a plurality of addresses of the memory array received in association with a first plurality of commands for accessing the plurality of addresses of the memory array, and after a subsequent event, a second set of scrambling sequences for the plurality of addresses as received in association with a second plurality of commands for accessing the plurality of addresses after the subsequent event and associated with second data, wherein the second set of scrambling sequences is different than the first set of scrambling sequences, wherein a generation of the second set of scrambling sequences is configured to render scrambled first data stored in portions of the memory array invalid, the scrambled first data comprising first data scrambled with the first set of scrambling sequences, and wherein the portions of the memory array correspond to the plurality of addresses and are configured to be accessed after the scrambled first data stored in the portions of the memory array are rendered invalid as a result of the scrambled first data including the first set of scrambling sequences and as a result of the second set of scrambling sequences being generated; and
second circuitry coupled with the memory array and the first circuitry, the second circuitry configured to scramble the first data associated with the plurality of addresses based at least in part on the first set of scrambling sequences after the first event and second data based at least in part on the second set of scrambling sequences after the subsequent event, wherein the portions of the memory array comprise the scrambled first data after the first event and comprise the second data scrambled with the second set of scrambling sequences after the subsequent event.

14. The apparatus of claim 13, further comprising:
an external interface coupled with the second circuitry, wherein the second circuitry is further configured to scramble data communicated between the memory array and the external interface.

15. The apparatus of claim 13, wherein the first circuitry comprises:
third circuitry configured to randomly generate a number based at least in part on an occurrence of an event; and
fourth circuitry coupled with the third circuitry and configured to implement a hash function, the fourth circuitry configured to output scrambling sequences based at least in part on a most recent number received from the third circuitry, the plurality of addresses, and the hash function.

16. The apparatus of claim 13, wherein the second circuitry comprises:
exclusive OR logic configured to apply a scrambling sequence generated by the first circuitry for an address to a set of data that is associated with a same command as the address.

17. The apparatus of claim 13, further comprising:
a fuse array comprising:
a first set of fuses comprising repair information indicating first addresses in the memory array that are defective; and
a second set of fuses comprising a code for disabling a mode associated with scrambling data communicated to and from the memory array,
wherein the fuse array is configured to broadcast the repair information, the code, or both, to the memory array.

18. The apparatus of claim 17, further comprising:
a test component coupled with the fuse array and configured, to disable the mode, to trigger a fuse broadcast sequence comprising the code and the repair information, wherein bits of the code are non-sequentially transmitted during the fuse broadcast sequence.

19. The apparatus of claim 17, wherein:
at least one of the first circuitry and the second circuitry is further configured to be disabled based at least in part on the code being broadcasted from the fuse array.

20. An apparatus, comprising:
a memory array comprising a plurality of memory cells;
an external interface coupled with the memory array and configured to receive commands for accessing the memory array, the commands associated with addresses of the memory array;
a random number generator configured to generate a random number based at least in part on an occurrence of an event;
first logic coupled with the random number generator and the external interface and configured to implement a hash function to obtain a set of scrambling sequences for a set of addresses received from the external interface, wherein the set of scrambling sequences is based at least in part on the random number, the set of addresses, and the hash function;
second logic coupled with the first logic and configured to scramble, based at least in part on the set of scrambling sequences, data communicated to or from first memory cells of the plurality of memory cells that are associated with the set of addresses, wherein scrambled data is communicated to or from the first memory cells, the scrambled data comprising the data and the set of scrambling sequences based at least in part on the second logic being configured to scramble the data; and a fuse array comprising a set of fuses configured to store a code for disabling a mode associated with scrambling data communicated to or from the memory array.

21. The apparatus of claim 20, wherein the external interface comprises:

a command interface configured to receive the commands from a host and process the commands;

an address component coupled with the first logic and configured to obtain the addresses associated with the commands and provide the addresses to the first logic; and data pins coupled with the second logic configured to communicate data between the external interface and the host.

22. The apparatus of claim 20, wherein the second logic comprises:

exclusive OR logic configured to combine the set of scrambling sequences with sets of data associated with the set of addresses.

23. The apparatus of claim 20, further comprising:

a multiplexer coupled with the second logic and configured to route scrambled sets of data received from the second logic to the first memory cells that are associated with the set of addresses.

* * * * *